(12) United States Patent
Marks

(10) Patent No.: US 10,452,944 B2
(45) Date of Patent: Oct. 22, 2019

(54) MULTIFUNCTION PERIPHERAL ASSISTED OPTICAL MARK RECOGNITION USING DYNAMIC MODEL AND TEMPLATE IDENTIFICATION

(71) Applicants: KABUSHIKI KAISHA TOSHIBA, Tokyo (JP); TOSHIBA TEC KABUSHIKI KAISHA, Tokyo (JP)

(72) Inventor: Mitchell G. Marks, Dee Why (AU)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 157 days.

(21) Appl. No.: 15/811,116

(22) Filed: Nov. 13, 2017

(65) Prior Publication Data

US 2019/0147286 A1    May 16, 2019

(51) Int. Cl.
*G06K 9/32* (2006.01)
*G06K 17/00* (2006.01)

(52) U.S. Cl.
CPC ....... *G06K 9/3283* (2013.01); *G06K 17/0032* (2013.01)

(58) Field of Classification Search
None
See application file for complete search history.

(56) References Cited

U.S. PATENT DOCUMENTS

| | | | |
|---|---|---|---|
| 5,416,308 A * | 5/1995 | Hood | G06K 9/2054 235/454 |
| 7,077,313 B2 | 7/2006 | Chung et al. | |
| 7,555,145 B2 | 6/2009 | Holenstein et al. | |
| 8,331,740 B2 | 12/2012 | Davison et al. | |
| 9,710,742 B2 | 7/2017 | Li et al. | |
| 2001/0033688 A1* | 10/2001 | Taylor | G06K 17/0032 382/181 |
| 2004/0126036 A1* | 7/2004 | Poor | G06K 7/12 382/287 |
| 2013/0082106 A1* | 4/2013 | Hoshina | H04N 1/107 235/455 |
| 2014/0071475 A1 | 3/2014 | Megawa | |
| 2014/0247965 A1* | 9/2014 | Van Wesep | G09B 7/06 382/103 |
| 2015/0186760 A1 | 7/2015 | Albrecht | |

\* cited by examiner

*Primary Examiner* — Iman K Kholdebarin
(74) *Attorney, Agent, or Firm* — SoCal IP Law Group LLP; Jonathan Pearce

(57) ABSTRACT

A system for multifunction peripheral assisted optical mark recognition uses a scanner to scan at least one printed page to generate a scanned image of the at least one printed page and to optically detect a presence of a visible label on the scanned image. Then, the multifunction peripheral may extract a model identification and a template identification from the visible label, select a template, identifying locations from which image data is to be extracted from the scanned image, select a model, specifically identifying at least two types of acceptable marks within the image data to be extracted from the scanned image, and perform optical mark recognition on the location from which image data is to be extracted identified by the template using the at least two types of acceptable marks identified by the model to extract useful data from the image data.

20 Claims, 9 Drawing Sheets

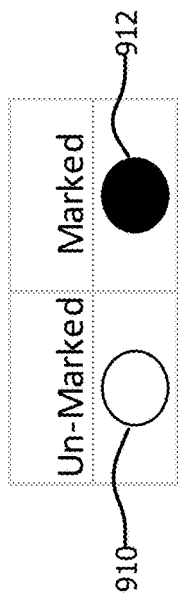

US 10,452,944 B2

MULTIFUNCTION PERIPHERAL ASSISTED OPTICAL MARK RECOGNITION USING DYNAMIC MODEL AND TEMPLATE IDENTIFICATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to the computer image recognition technologies and, more specifically, to a multifunction peripheral assisted optical mark recognition using dynamic model and template identification.

Description of the Related Art

Optical character recognition (OCR) has been available as a technology for some time. OCR has been available to the general public for at least the last 10-15 years. In a typical case, software can "read" a jpeg, tiff, or pdf image on a computer screen so as to "read" or to otherwise pull textual and other elements from that image and create a "text" document therefrom. The text documents typically are rich text documents, Microsoft® Word® documents, extensible markup language (XML), hypertext markup language (HTML) documents, or other, similar formats.

This extraction was and is especially common in the transition from paper documents to digital documents and other records (e.g. databases) so that computers can be used to assist in the conversion of data and other information held in physical documents into digital form. The benefit of extracting text from pre-existing documents are primarily that a computer may then be used to act upon the data or other information held in those documents. The documents, for example, may be searched or categorized.

A similar technological field is optical mark recognition ("OMR"). Optical mark recognition is a technology that enables computer systems to detect the presence or non-presence of marks on a document. OMR has traditionally been the task of specialized OMR hardware reliant upon pre-determined sets of "answer sheets" or "ballots." The most common types of these systems are scanners and computer systems that receive a test "key" for a multiple-choice test and then may automatically grade subsequently input test answer sheets in a similar format. Another scenario is a vote-counting machine that relies upon marking of a physical card. In that case, there is no answer "key", but the location of a viable mark must still be detected so that the vote may be associated with a particular candidate or particular response to a question posed to the voters. Other scenarios wherein OMR is used may also be envisioned.

Most of the existing OMR systems are rigid. The systems require specialized scanning hardware, or when they do not, require pre-determined templates. For example, there may be a set number of potential "ballot" formats, one of which must be selected and used for a particular OMR system to work. Also, in virtually all of these OMR systems, there are a set group of "accepted" and "unaccepted" marks. One may recall the "completely fill in the bubble" admonition for standardized testing while in school. However, more flexibility is sometimes desired by a tester or, in particular, in a voting station. The government strongly favors each vote counting, no matter the form a particular "mark" by a voter on a ballot took. Still, these systems are typically limited to a pre-determined set of potential input documents and input markings. These systems must be informed as to the appropriate template to use, and may then rely upon that template.

DESCRIPTION OF THE DRAWINGS

FIGS. 9A and 9B are examples of optical mark recognition models.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
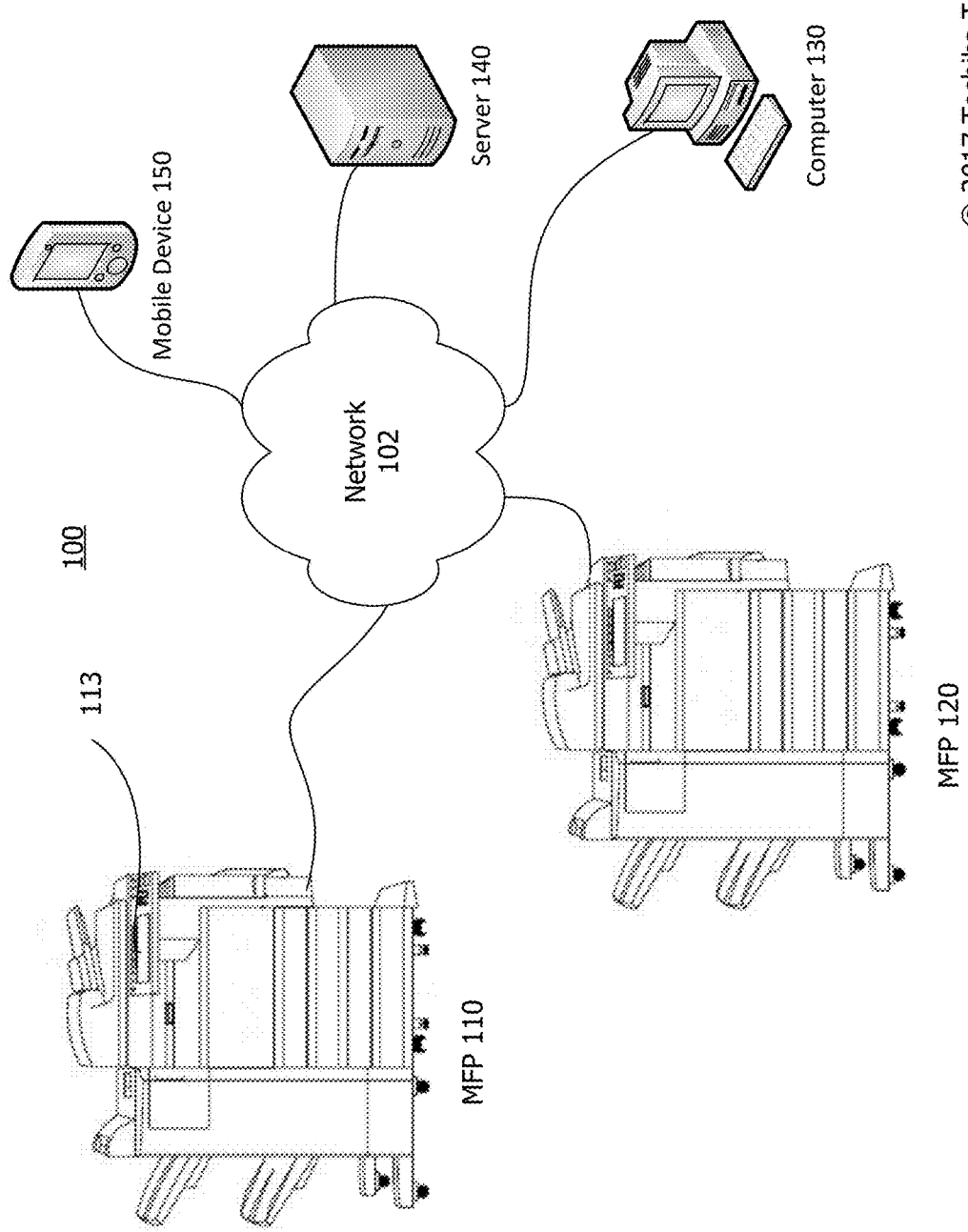
FIG. 1 is a diagram of an MFP system.

Referring now to FIG. 1 there is shown an MFP system 100. The MFP system 100 includes an MFP 110, MFP 120, a computer 130, a server 140, and a mobile device 150, all interconnected by a network 102. The MFP system 100 may be implemented in a distributed computing environment and interconnected by the network 102. An MFP system 100 may include more MFPs, more or fewer servers, and more than one computer 130, server 140, or mobile device 150.

The network 102 may be or include a local area network, a wide area network, a personal area network, a mobile or telephone network, the Internet, an intranet, or any combination of these. The network 102 may have physical layers and transport layers according to IEEE 802.11, Ethernet or other wireless or wire-based communication standards and protocols such as WiMAX®, Bluetooth®, mobile telephone and data protocols, the public switched telephone network, a proprietary communications network, infrared, and optical.

The MFP 110 is a multifunction peripheral. Multifunction peripherals are distinct from individual function peripherals in that they have hardware and software for performing more than one operation selected from the group including, at least: printing, scanning, facsimile, cloud storage, emailing, or electronic document generation.

The MFP 110 may be equipped to receive portable storage media such as USB drives. The MFP 110 includes a user interface subsystem 113, which communicates information to and receives selections from users. The user interface subsystem 113 has a user output device for displaying graphical elements, text data or images to a user and a user input device for receiving user inputs. The user interface subsystem 113 may include a touchscreen, LCD display, touch-panel, alpha-numeric keypad and/or an associated thin client through which a user may interact directly with the MFP 110.

The MFP 120 may be substantially identical to the functions and capabilities of the MFP 110. That description will not be repeated.

The computer 130 is hardware that executes software. The computer may be, for example, a desktop or laptop computer connected to the network 102 with operating system software and other specialized software that enables the functions described herein. The computer 130 or the server 140 (discussed below) may be used for a portion of the processes described below.

The server 140 is hardware that executes instructions from software operating on a server computer connected to the network 102.

The mobile device 150 is a mobile or handheld PC, a tablet or smart phone, a feature phone, smart watch, or other similar device. The mobile device 150 is also a computing device that includes software including instructions that are executed by the hardware. The mobile device 150 is representative of one or more end-user devices and in some cases, may not be a part of the overall MFP system 100.

Figure 2:
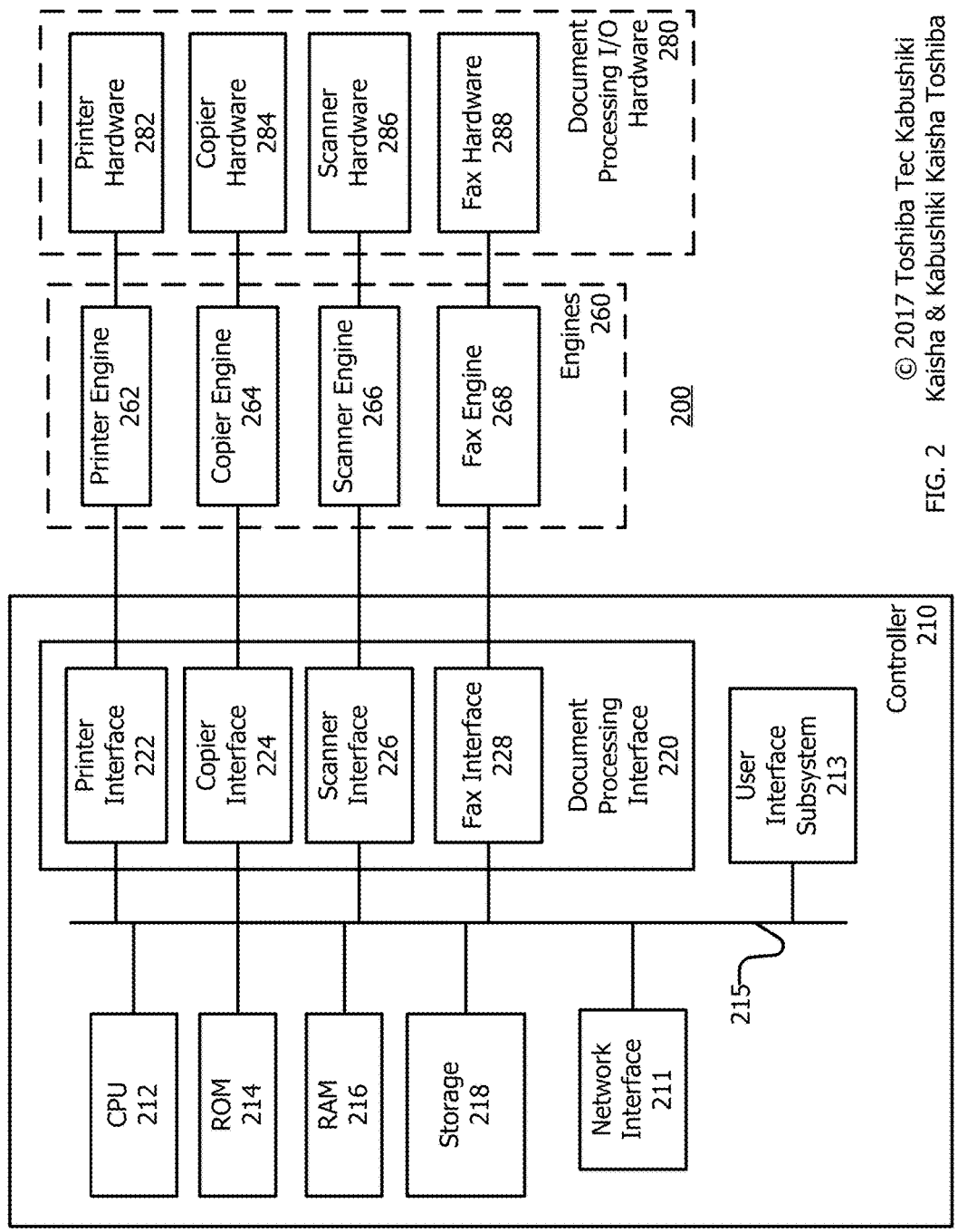
FIG. 2 is a block diagram of an MFP.

Turning now to FIG. 2 there is shown a block diagram of an MFP 200 which may be the MFP 110 (FIG. 1). The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through network-attached storage, distributed storage systems, cloud storage or other storage systems.

The network interface 211 interfaces the MFP 200 to a network, such as the network 102 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously. However, the MFP 200 may be controlled from and provide output to the user interface subsystem 213, which may be the user interface subsystem 113 (FIG. 1).

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions.

Figure 3:
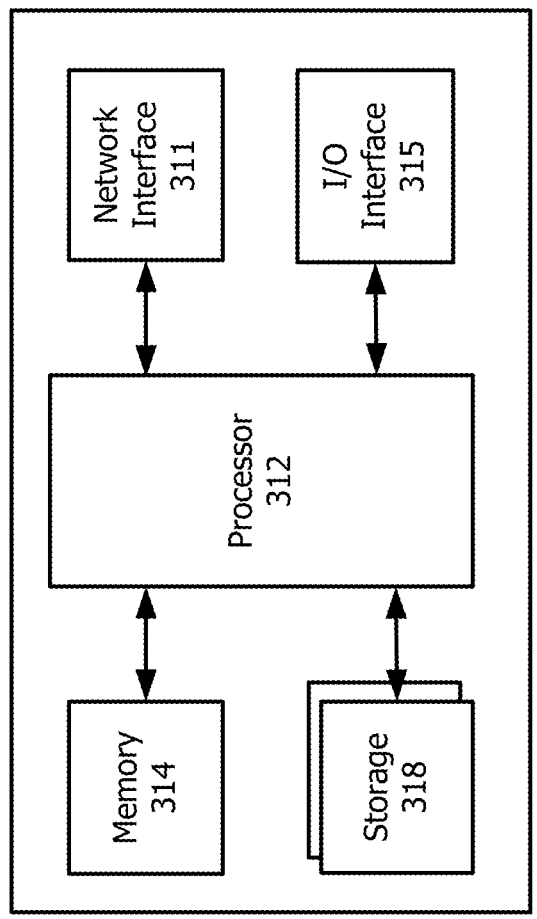
FIG. 3 is a block diagram of a computing device.

Turning now to FIG. 3 there is shown a computing device 300, which is representative of the server computers, client devices, mobile devices and other computing devices discussed herein. The controller 210 (FIG. 2) may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors and, application specific integrated circuits (ASICs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312. As used herein the term "memory" expressly does not include transitory media such as waveforms and signals.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage. As used herein the term "storage" expressly does not include transitory media such as waveforms and signals.

The network interface 311 includes an interface to a network such as network 102 (FIG. 1).

The I/O interface 315 interfaces the processor 312 to peripherals (not shown) such as displays, keyboards and USB devices.

Figure 4:
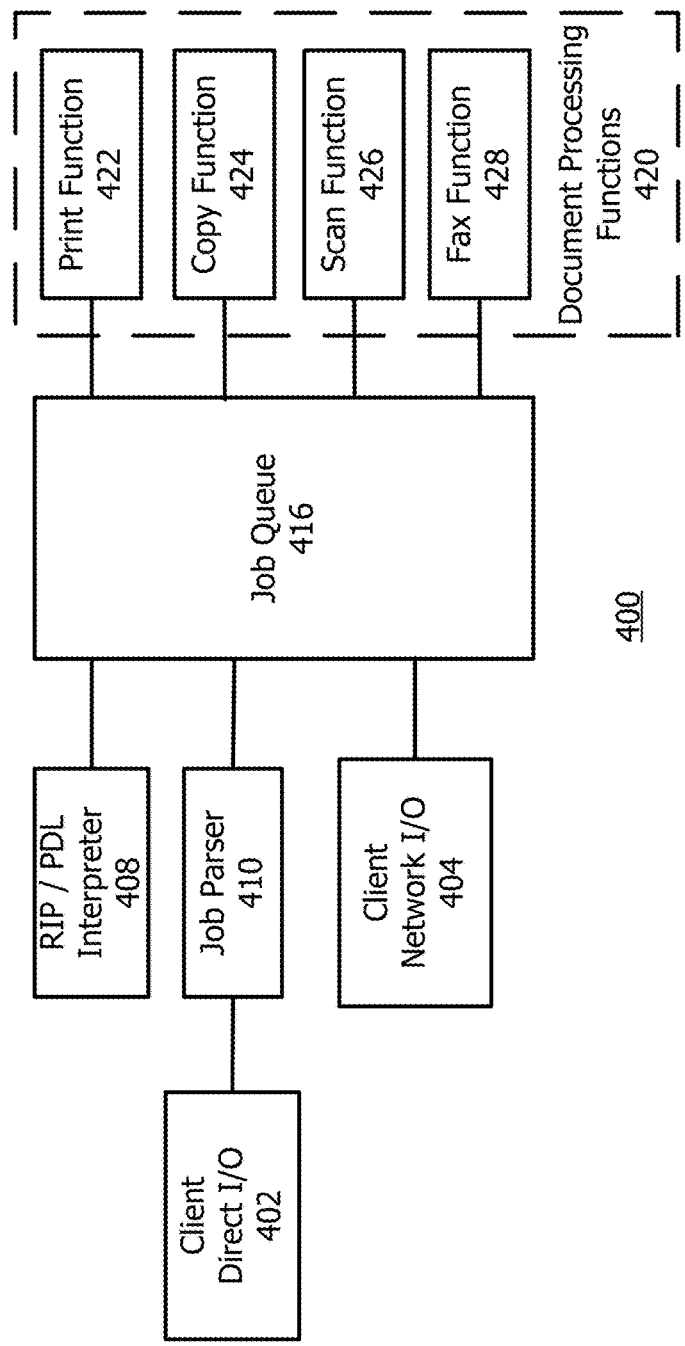
FIG. 4 is a block diagram of a software system for an MFP.

Turning now to FIG. 4 there is shown a block diagram of a software system 400 of an MFP which may operate on the controller 210. The system 400 includes client direct I/O 402, client network I/O 404, a RIP/PDL interpreter 408, a job parser 410, a job queue 416, a series of document processing functions 420 including a print function 422, a copy function 424, a scan function 426 and a fax function 428.

The client direct I/O 402 and the client network I/O 404 provide input and output to the MFP controller. The client direct I/O 402 is for the user interface on the MFP (e.g., user interface subsystem 113), and the client network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail, TELNET or other network communication protocols.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the client network I/O 404. The job queue 416 and associated software is responsible for determining the order in which print, copy, scan and facsimile functions are carried out. These may be executed in the order in which they are received, or may be influenced by the user instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the client direct I/O 402. The client direct I/O 402 may include printing, fax transmission or other input of a document for handling by the system 400.

The print function 422 enables the MFP to print documents and implements each of the various functions related to that process. These include stapling, collating, hole punching, and similar functions. The copy function 424 enables the MFP to perform copy operations and all related functions such as multiple copies, collating, 2 to 1 page copying or 1 to 2 page copying and similar functions. Similarly, the scan function 426 enables the MFP to scan and to perform all related functions such as shrinking scanned documents, storing the documents on a network or emailing those documents to an email address. The fax function 428 enables the MFP to perform facsimile operations and all related functions such as multiple number fax or auto-redial or network-enabled facsimile.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

Unless otherwise expressly stated herein, the term "document" refers to a digital or electronic document as opposed to a physical document. Physical documents will be referred to as "physical" documents, meaning that they are visibly printed words, images, or other symbols on a physical piece of paper or other material.

Description of Processes

Figure 5:
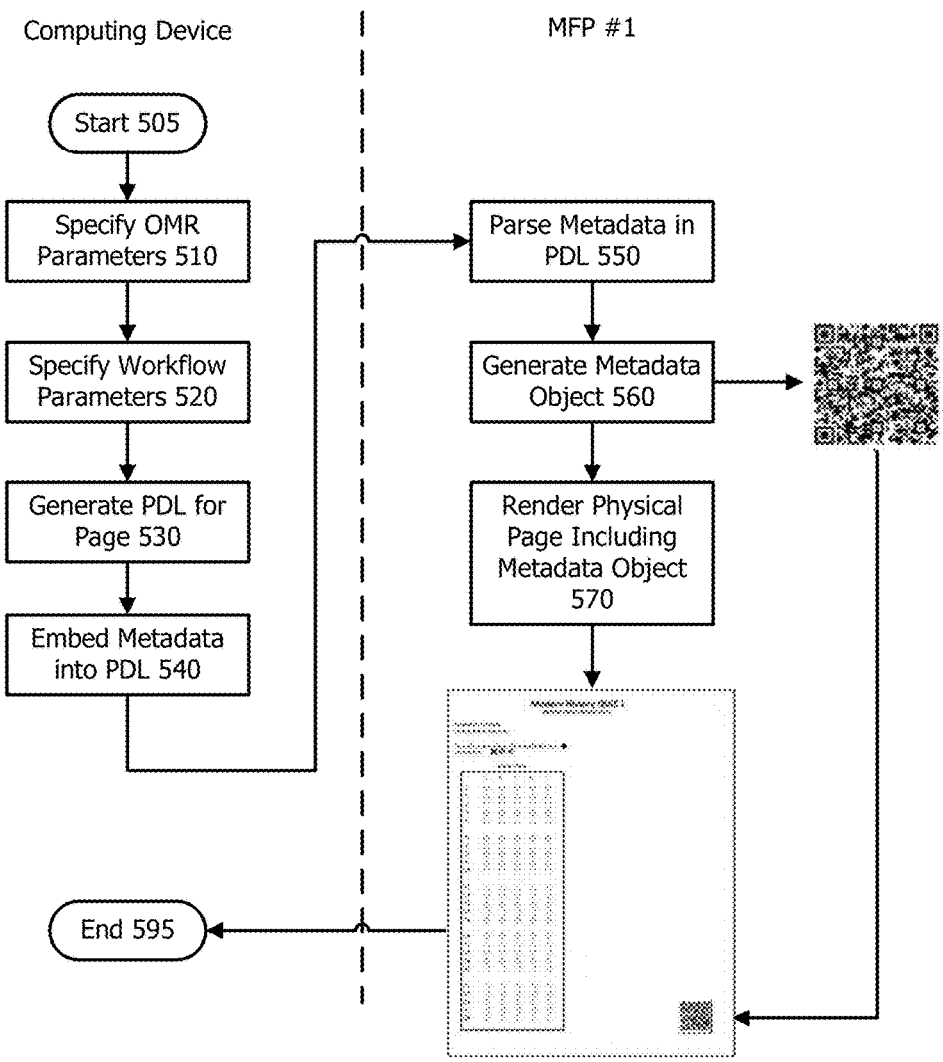
FIG. 5 is a flowchart of a process for generating and applying metadata for an optical mark recognition model and a positional template based upon data in a page description language document.

Referring now to FIG. 5, a flowchart of a process 500 for generating and applying metadata for an optical mark recognition model and a positional template based upon data in a page description language document is shown. Following the start 505, the process continues until the end 595 for each page of data or in a set of data. However, the process may be restarted for each page or for each new set of pages that are subjected to the overall process. The process 500 overlaps multiple devices, in this case a computing device and an MFP #1, as may be seen in FIG. 5.

The first step following the start 505 is to specify the OMR parameters 510. As shown in FIG. 5, the process 500 begins on a computing device. This computing device may be the computer 130, the server 140, or the mobile device 150. In some cases, the computing device may actually be an MFP, like MFP #1. This is enabled because modern MFPs incorporate increasingly sophisticated and powerful processors and other hardware systems such that they are capable of operating in much the same manner as a more typical stand-alone computing device.

The specification of OMR parameters at 510 is accomplished using software on a computing device. This may be, for example, a part of a printer "print" process initiated using print driver software that may output a form (e.g. a "bubble sheet" test page, or a bubble voter card) that may be used by a person, then become the subject of OMR following use. The specification of OMR parameters at 510 may take place as a part of a document creation or editing process as a subroutine or extension of a word processor or document display application (e.g. Microsoft® Word® or Adobe® Reader).

The OMR parameters specified at 510 include, at least, an identification of an OMR model and a positional template. The positional template may be identified in the software by a number, a code, a flag, or other unique indicia. The positional template identifies the "locations" within a document at which OMR software should "look" for relevant marks. So, for a "bubble sheet" for a multiple-choice test, the locations identified may be a series of 5-box columns running along the left side (or in multiple columns) of the test "bubble sheet." The positional template may define these locations using HTML or XML with, for example, positional pixel coordinates relative to the total pixels in an image of a page along with a pixel height and pixel width.

Images created by an MFP when scanning a physical page may be scaled when it is created as a scanned image to an exact pixel height and width best-suited to performing OMR. As used herein, the phrase "scanned image" is a scanned capture of a physical page upon which OMR will be performed. A first mark area may be identified by an (x, y) coordinate relative to an upper-left corner of a scanned image, and may have an associated width (w) and height (h) which define the number of pixels further to the right (w) and down (h) from the (x, y) origin point where the "mark area" is defined. These mark areas may be defined for literally hundreds or thousands of potential mark locations on a given page. The entirety of all of these mark locations or positions is defined by the positional template or, simply, template. To be explicit, this positional template or template is not defined in hardware and is not defined by an example sheet input into a scanner. The template is defined in software as a series of coordinates in XML or HTML format generated by the software in the process of specifying the OMR parameters at 510.

The OMR model is also defined when the OMR parameters are specified at 510. Two example OMR models are shown in FIGS. 9A and 9B. The optical recognition model defines the types of input that will be found acceptable and may define the types of input that will not be found acceptable. So, turning to FIG. 9A, two examples of acceptable marks are shown. The first mark 910 is actually no mark at all. This mark is "acceptable" in the sense that it will be recognized by an OMR system as an "un-marked" bubble. Un-marked means that this "answer" or "selection" was not identified by the individual within the relevant mark area. The second mark 912 is a fully filled-in bubble which will be recognized by the OMR system as a "marked" answer or selection.

The definition of the OMR model is very useful because it significantly lowers the complication of the problem of whether or not a particular location has been "marked" by carefully limiting the options available to the OMR system performing the OMR process. For example, in traditional optical character recognition, the computer must use fairly-high resolution capture of each page and a careful analysis because one of 26 letters may be being formed in a relatively small space on a given page. Likewise, there exist numerous punctuation, accents, numbers, and other symbols that may be detected. So, optical character recognition operates in a much more open world of possibilities for detection and, thus, must be much more careful in its analysis.

In contrast, when the world of possibilities is limited to either unmarked at 910 or marked at 912, the image being captured may be lower resolution and the decision may be much simpler. If sufficient levels of color appear within the mark area(s) defined by the positional template, then the OMR will identify the input as "marked." If there is insufficient (or none, depending on the sensitivity) marking, the OMR will identify the input as "un-marked." When the simplified universe of possibilities provided by the OMR model is combined with a detailed positional template to lower the overall search area for where marks may be found, the OMR process becomes much more accurate and less processor intensive. This is helpful for enabling the MFP itself, with a generally lower-powered processor relative to most desktop computers, to perform the OMR process on its own as an added function of the MFP rather than employing a desktop computer or specialized scanning and processing hardware for the task.

The OMR model shown in FIG. 9B includes a first mark 914 that is "un-marked" along with four different marks 915, 916, 917, 918 that may satisfy the requirement of a "marked" bubble. Though this OMR model is more complex than the one shown in FIG. 9A, the overall universe of acceptable inputs remains quite small. A single dot, for example, would not be an acceptable input for marked or unmarked. If it were registered at all (e.g., it may generate an "un-marked" result because it is a single dot and too small to detect), it would likely be categorized as unresponsive. Logic may be applied as a part of the OMR model as well. For example, logic may be directed to always treat non-responsive marks as "un-marked," to treat them as "marked," or to treat them as merely non-responsive and to generate an error.

Still, with only five potential accepted marks 914, 915, 916, 917, and 918, the OMR system may use a relatively lower-resolution image of a scanned page because the OMR system is capable of identifying whether or not a particular mark falls into the accepted marks 914, 915, 916, 917, and 918. Logic may be employed to deal with those that are not easily identified. Thus, the eventual process of identification may be made much faster, less processor intensive, and may be offloaded to the MFP itself without sacrificing speed or accuracy.

FIGS. 9A and 9B are merely examples of OMR models. Many other models may be defined including various kinds of marks, actual words or letters, partial or entire alphabets, or other characters.

Returning to FIG. 5, once the positional template and OMR model are specified as a part of the OMR parameters at 510, the process can continue. Other OMR parameters may also be defined such as appropriate answers for an answer key, a desired level of accuracy, or the presence of multiple pages or columns.

Once the OMR parameters are specified at 510, the process turns to specification of workflow parameters at 520. At this stage, the OMR parameters and any other processing parameters are prepared for embedding into a portable document language format document (or other document type). At this stage, the associated positional template, OMR parameters, any answer key may be given (or identified as), along with any post-processing desired may be given a particular number. For example, the positional template may be template #1, the OMR parameters may be OMR parameters #1, the answer key may be answer key #1 and the workflow parameters may be #1 as well. Each of those numbers (and the associated template, settings, etc.) may be pre-defined by a manufacturer or an administrator of the system. Or, those numbers (and the associated template, settings, etc.) may be set by the software that is in the process of specifying the workflow parameters at 520 and saved to the computer, a server, a cloud service, the MFP or to multiple MFPs or the manufacturer's cloud server such that the associated data for, for example, template #1, OMR parameters #1, and answer key #1 may be identified by an MFP (or computer) later that is extracting the associated data. To access these settings, authentication may be required.

The workflow parameters may define, for example, what occurs during the OMR process itself or after it is complete.

For example, the workflow parameters may specify that after a set of ballots are scanned and OMR is performed, that a report be output to the voting coordinator or that no report be locally generated, but that the results be uploaded to a secure website or otherwise transmitted to a statewide voting authority. In the case of a test being graded, the workflow parameters may be instructed to print out or to store an anonymized report of the results for each test taker following completion of the grading process. The associated workflow may differ, including the formatting, operations to be accomplished, storage locations, and output parameters, for each set of workflow parameters.

Once those parameters are specified at 520, the page description language (or other format) document may be generated at 530. At this stage, the associated document (e.g. an answer sheet) is created in PDL format (or other, similar format). In some cases, a portable document format (PDF) document may be created or may also be created for storage of a visual representation of the PDL. The PDL document describes a document in such a way that it may be printed along with all relevant settings for that printing and visual representation by a printer.

Next, the metadata is embedded at 540 in the PDL document such that it includes the associated OMR parameters specified at 510 and the workflow parameters specified at 520. The PDL is a page description language document that may include embedded within the PDF (for example in the/Info object definition) the associated OMR and workflow parameters. If a PDF is created and is displayed visually on a computer screen, the associated OMR and template parameters are not displayed because they are hidden metadata within the PDF/Info object definition. However, the parameters may be detected by and provide instructions to an MFP when printing is requested by a computer.

The associated metadata may take the following form when stored in the/Info object definition:

<obj_num>0 obj
<<
   /Producer (Toshiba PHOcr)
   /CreationDate (D:<UTCDATETIME>)
   /ModDate (D:<UTCDATETIME>)
   /PHOcrOMRWorkflowID 1
   /PHOcrOMRModelID 1
   /PHOcrOMRTemplateID 1
   /PHOcrOMRisAnswerKeyID 1
   /PHOcrOMRRenderLocation BOTTOM_RIGHT
>>
endobj The PDL document is generally created as a part of a "print" function by a computing device that simultaneously transmits the PDL to a printing device. In FIG. 5, that printing device is MFP #1. Although, as pointed out above, though these processes are shown as taking place on a computing device and MFP #1, the processes could all take place on the MFP itself.

On MFP #1, the metadata embedded in the PDL document is parsed at 550. At this stage, the encoded data identifying the positional template, the OMR model and any answer key along with any other data is gathered from the PDL document so that it may be used by the MFP.

Next, a metadata object is created at 560. This metadata object is a visual label or image like a barcode, a QR Code, or other, similar representation of a visible label that will be superimposed on the eventual physical document that is output by the MFP. This metadata object encodes data identifying the positional template, the OMR model, any answer key, and any other data desired to be visible on the eventual physical document and that made up a part of the OMR parameters and the workflow parameters generated at 520 and 530.

Finally, the physical page, including the metadata object (visible label), is rendered and printed at 570. That physical page now includes a visible label including information sufficient to identify the positional template and OMR model along with any other data encoded therein.

The process then ends at 595 for that page. The process may begin again at start 505 for another page.

Figure 6:
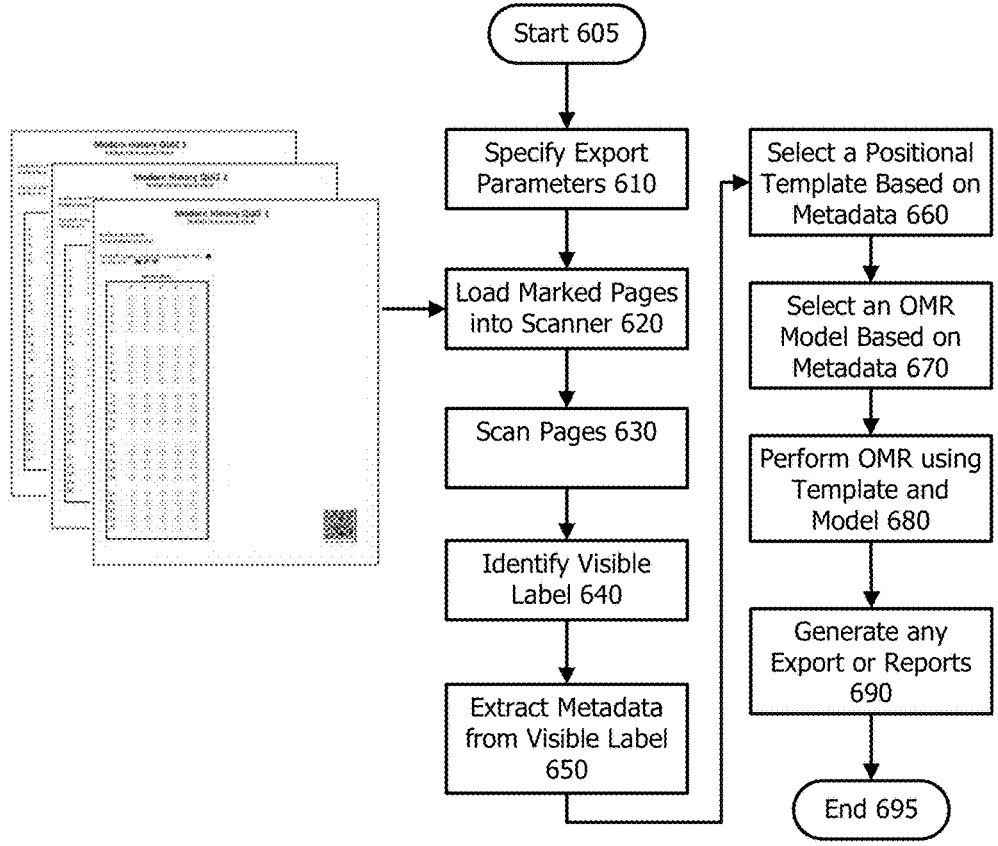
FIG. 6 is a flowchart of a process of extracting an OMR model and positional template based upon a visible label on a physical document.

FIG. 6 is a flowchart of a process 600 of extracting an OMR model and positional template based upon a visible label on a physical document. The process begins at start 605 and continues to end 695 for each group of pages to which a particular positional template and OMR model pertain. However, the process can repeat for every page or group of pages.

Following the start 605, the export parameters may be specified by a user of the MFP #2. For example, once the associated data is extracted from the pages (e.g. the places where data is marked or not-marked, whether those answers were correct, or increase vote tallies, and what to do with that data including any associated outputs or storage systems for storing the resulting data), the export parameters define what will be done with that data. There may be default export parameters that are used in the absence of any altered export parameters being input.

After the specification of any export parameters at 610, the pages marked with visible label that encodes the metadata are loaded into the scanner of the MFP at 620. The pages, for example, may be a series of test answer sheets filled out by students or a series of ballots filled out by voters.

The pages are then scanned at 630. This scanning process initially creates a large, single image of each page. If two-sided scanning is used, each side may have its own image. Notably, if the processes described herein are used, there is a visible label on the face of at least one of the documents, potentially on all pages.

The visible label is identified on each page at 640. The identification of the visible label may be relatively simple using image processing techniques because a tight pattern of data of a particular, expected form is relatively easy to detect. Barcodes, QR codes, specialized images and similar visible labels are designed to be easily-identifiable.

As a part of the visible label being identified, its location within the scanned image of a page may also be noted by the OMR system. Specifically, once data is extracted identifying the associated positional template, that template may be applied relative to the actual position of the visible label on the scanned image. In this way, though the locations of marks may differ slightly from page to page due to folding, cutting, and input irregularities; the positional template may operate from a fixed, known origin point, the visible label.

Once the label is identified by the MFP software, the metadata may be extracted from the visible label at 650. QR codes, and barcodes, and similar visible labels are relatively small and, therefore, cannot contain large volumes of computer-readable data. However, once the visible label is detected, the data stored in the visible label may be extracted by parsing its contents. If the label content described above is used, the extraction may result in reproduction of the data:

/PHOcrOMRWorkflowID 1
   /PHOcrOMRModelID 1
   /PHOcrOMRTemplateID 1
   /PHOcrOMRisAnswerKeyID 1

A processor in the MFP parsing this data can identify that the appropriate OMR model is 1, the appropriate positional template is 1 and that the appropriate answer key is 1.

The MFP may then select positional template 1 based upon the metadata extracted from the visible label at 660. As discussed above, the positional template identifies locations within the electronic document (e.g. the scanned image) that are to be searched for the presence or absence of marking.

Likewise, the OMR model may also be selected based upon the metadata extracted from the visible label at 670. Other data, such as the appropriate answer key, may also be extracted. As discussed above the OMR model specifies whether or not a particular marking is a "mark" or "unmarked" when evaluated by an associated processor. An answer key defines the "correct" and "incorrect" answer(s) for a form, if they exist.

Both the OMR model and positional template identified at 660 and 670 are only possible through the use of intelligent tagging or identification of the positional template and OMR model by short-hand names. The manufacturer, an MFP administrator, an operator, or the like may create, use, and control access to the set of defined OMR models and positional templates form which the number, 1 in this case, defines. Otherwise, all of the data necessary for the positional template or the OMR model would be impossible to encode on the face of the document itself when it is printed in the visible label. Instead, only a representation of the OMR model and positional template may be stored because the visible label can only store a limited amount of data.

As discussed above, these numbers for the OMR model, positional template, answer key, and other workflow parameters may be stored locally, pre-determined by a manufacturer or administrator, or may be captured and stored "in the cloud" or on a remote server for access by one or more computers and MFPs that are a part of an authenticated network, VPN or other integrated system or service.

These pieces of data may be stored remotely so that they can be created, updated, or maintained by an MFP manufacturer, a system administrator, voting administrator, or school system IT director. If the templates and models and workflow parameters are maintained remotely, they need only be updated in a single place to make changes to an entire system or set of many MFPs and associated computing devices. In some cases, this data may remain remote from the MFPs and computing devices or, alternatively, it may be updated in a single location and transmitted down to the MFPs and computing devices on a schedule for updating the MFPs and computing devices to thereby distribute the new or updated templates, models, and other parameters.

Authentication may be required for any of this data to ensure security. In this way, sensitive data such as an answer key may be securely maintained such that access to individual test pages or to the MFP itself does not grant access to the answer key. Likewise, storage of the vote tallies or the voting results from a particular ballot may be stored remotely without any recognition by a human as to what or whom the associated votes on a ballot were.

Then, optical mark recognition may be performed at 680 using the OMR model and positional template intended for the associated document. Thanks to the positional template, the locations within the captured image of the page where the OMR is required to look are made fewer and more-specific. And, as discussed above, the detection of the visible label in the scanned image enables the positional template to be set relative to the visible label location in the scanned image. This can dramatically increase accuracy. Likewise, thanks to the OMR model, the processing necessary to accomplish the searching for "marked" and "un-marked" "bubbles" is substantially reduced as well. As a result, the MFP itself may perform this function and tally any results.

Though discussed as taking place on the MFP, some of the OMR processing, following scanning of the physical document pages, may take place on a remote server or in the "cloud" upon shared resources. For security purposes, an MFP may intentionally be used for these processes to reduce the potential for external access to the data, for example, on a series of voter's ballots.

Finally, if directed by the export parameters specified at 610, the MFP may generate any export or reports at 690. These may be the test results in percentage forms for a number of tests or may be the vote tallies for a group of voters. The export may be to a secure local storage or to a remote network. Likewise, the generated reports may be printed immediately or may be stored on a network drive or other computer location.

Figure 7:
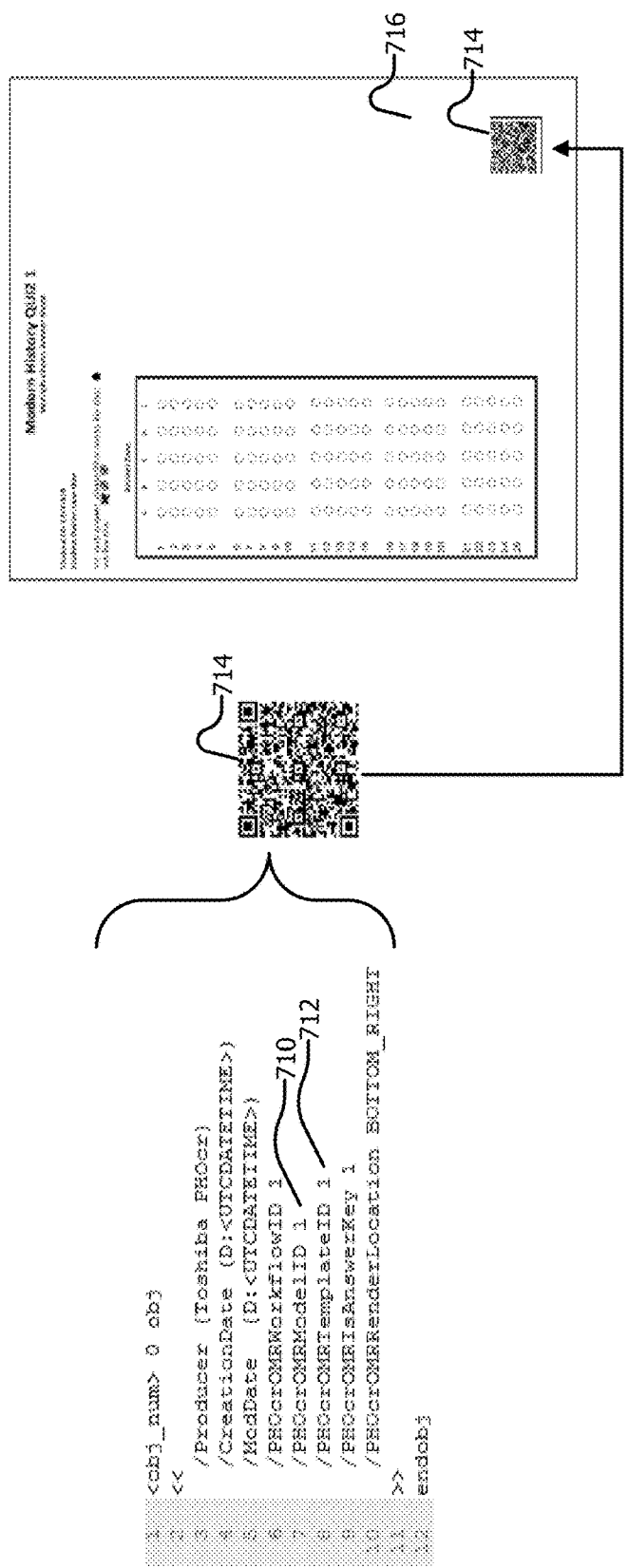
FIG. 7 is an example of the application of a visible label associated with metadata.

FIG. 7 is an example of the application of a visible label associated with metadata. In FIG. 7, the metadata regarding the OMR model 710 and the positional template 712 are represented, first, as code embedded within a PDL or PDF document. When that code is interpreted by a raster image processor associated with an MFP, the MFP generates a visible label 714 that encodes that metadata. Finally, the visible label 714, including the encoded metadata, is affixed to a location on the associated page 716 for later use in performing OMR on the document.

Figure 8:
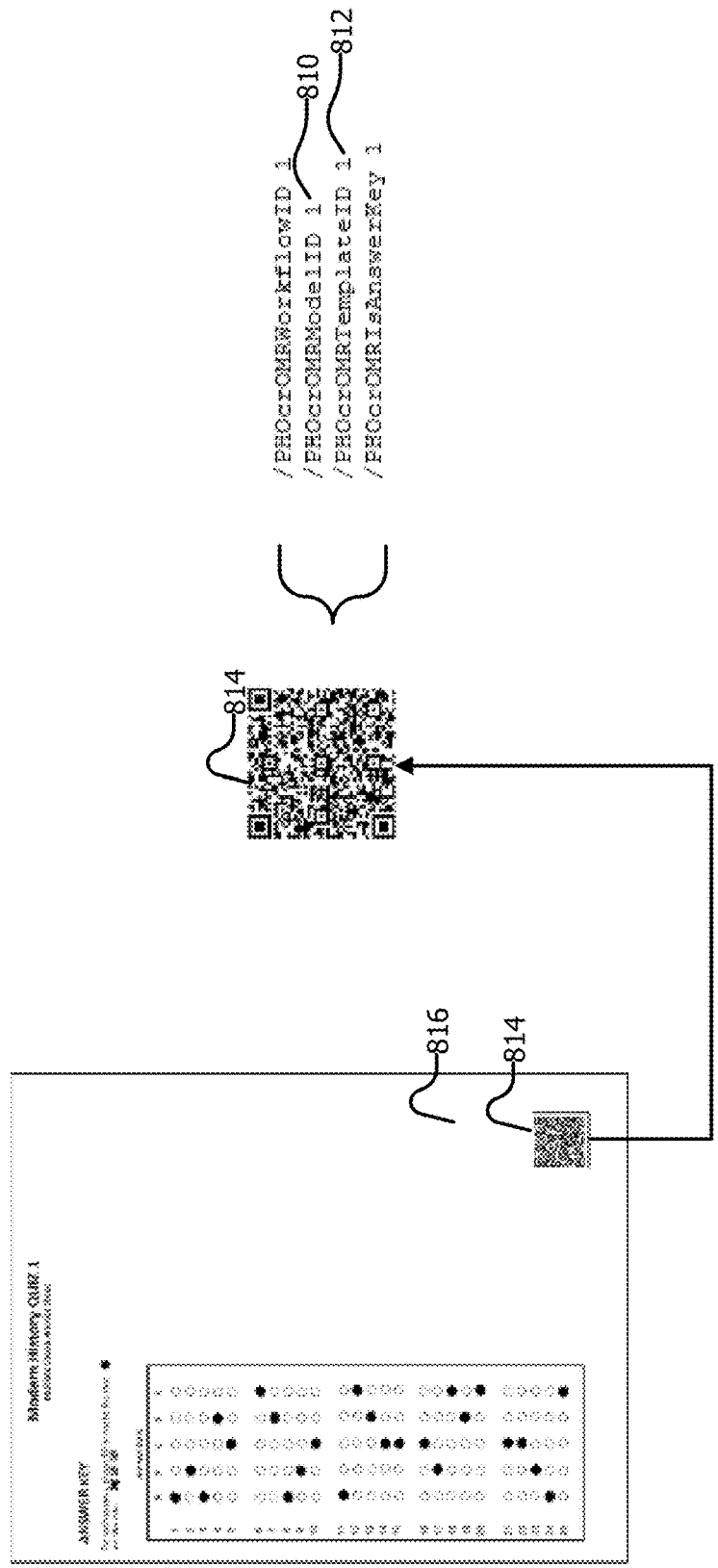
FIG. 8 is an example of the extraction of metadata from a visible label.

FIG. 8 is an example of the extraction of metadata from a visible label. Here, the page 816 with the answers now filled-in by a test taker, includes the visible label 814. The visible label 814 is identified and the associated metadata is extracted for use in performing OMR. The metadata includes the identity of the OMR model 810 and the positional template 812 that were encoded in the metadata when it was embedded. That data may be meaningless in the abstract, but when encountered by an appropriately-programmed MFP, it instructs the MFP in how to evaluate the associated document.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for multifunction peripheral assisted optical mark recognition using dynamic model and template identification, comprising:
   a scanner for:
      scanning at least one printed page to generate a scanned image of the at least one printed page;
      optically detecting a presence of a visible label on the scanned image;
   a processor for:
      extracting a model identification and a template identification from the visible label;
      selecting a template based upon the template identification, the template for identifying locations from which image data is to be extracted from the scanned image;
      selecting a model based upon the model identification, the model specifically identifying at least two types of acceptable marks within the image data to be extracted from the scanned image, the at least two types of acceptable marks defining characteristics of the image data for use in optical mark recognition; and
      performing optical mark recognition on the location from which image data is to be extracted identified by the template using the at least two types of acceptable marks identified by the model to extract useful data from the image data.

2. The system of claim 1, further comprising:
   a computing device for:
      identifying the template and the model, based upon the content and type of a physical document in the process of being printed from a page description language electronic document;
      encoding the template and the model within the visible label in the output physical document; and
   printer hardware for printing the physical document including the visible label.

3. The system of claim 2 wherein the computing device performs the encoding the template and the model according to a known set of parameters such that processor must have access to the known set of parameters to be able to extract the model identification and the template identification from the visible label.

4. The system of claim 2 wherein the processor and the scanner are a part of a multifunction peripheral and the computing device and printer hardware are a part of a second multifunction peripheral.

5. The system of claim 1 wherein the model includes a series of types of acceptable marks.

6. The system of claim 3 wherein the series includes as acceptable marks, at least, unmarked, filled-in, checked, crossed, and circled.

7. The system of claim 3 wherein the series includes Unicode text as the series of acceptable marks.

8. Apparatus comprising a storage medium storing a program having instructions which when executed by a processor will cause the processor to:
   scan at least one printed page to generate a scanned image of the at least one printed page;
   optically detect the presence of a visible label on the scanned image;
   extract a model identification and a template identification from the visible label;
   select a template based upon the template identification, the template identifying locations from which image data is to be extracted from the scanned image;
   select a model based upon the model identification, the model specifically identifying at least two types of acceptable marks within the image data to be extracted from the scanned image, the at least two types of acceptable marks defining characteristics of the image data for use in optical mark recognition; and
   perform optical mark recognition on the location from which image data is to be extracted identified by the template using the at least two types of acceptable marks identified by the model to extract useful data from the image data.

9. The apparatus of claim 8, further comprising a second storage medium storing a second program having instructions which when executed by a second processor will cause the second processor to:
   identify the template and the model, based upon the content and type of a physical document in the process of being printed from a page description language electronic document;
   encode the template and the model within the visible label in the output physical document; and
   print the physical document including the visible label.

10. The apparatus of claim 9 wherein the template and the model are encoded according to a known set of parameters such that the processor must have access to the known set of parameters to be able to extract the model identification and the template identification from the visible label.

11. The computing device of claim 9, wherein the processor is a part of a multifunction peripheral and the computing device and printer hardware are a part of a second multifunction peripheral.

12. The computing device of claim 8 wherein the model includes a series of types of acceptable marks.

13. The computing device of claim 10, wherein the series includes as acceptable marks, at least, unmarked, filled-in, checked, crossed, and circled.

14. The computing device of claim 3 wherein the series includes Unicode text as the series of acceptable marks.

15. The apparatus of claim 8 further comprising:
   a processor;
   a memory; and
   wherein the processor and the memory comprise circuits and software for performing the instructions on the storage medium.

16. A method of performing multifunction peripheral assisted optical mark recognition using dynamic model and template identification, comprising:
   utilizing a scanner for:
      scanning at least one printed page to generate a scanned image of the at least one printed page;
      optically detecting a presence of a visible label on the scanned image;
   utilizing a processor for:
      extracting a model identification and a template identification from the visible label;
      selecting a template based upon the template identification, the template identifying locations from which image data is to be extracted from the scanned image;
      selecting a model based upon the model identification, the model specifically identifying at least two types of acceptable marks within the image data to be extracted from the scanned image, the at least two types of acceptable marks defining characteristics of the image data for use in optical mark recognition; and performing optical mark recognition on the location from which image data is to be extracted identified by the template using the at least two types of acceptable marks identified by the model to extract useful data from the image data.

17. The method of claim 16, further comprising:
utilizing a computing device to:
  identify a template and a model, based upon the content and type of a physical document in the process of being printed from a page description language electronic document;
  encoding the template and the model within the visible label in the output physical document; and
printing the physical document including the visible label.

18. The method of claim 17 wherein the computing device performs the encoding the template and the model according to a known set of parameters such that processor must have access to the known set of parameters to be able to extract the model identification and the template identification from the visible label.

19. The method of claim 16 wherein the model includes a series of types of acceptable marks including, at least, unmarked, filled-in, checked, crossed, and circled.

20. The method of claim 19 wherein the series includes Unicode text as the series of acceptable marks.

* * * * *